Dec. 27, 1960 C. A. SCHMITT 2,966,557

TELEPHONE DIALING APPARATUS

Filed Aug. 1, 1957 5 Sheets-Sheet 1

INVENTOR
Carl A. Schmitt
BY: Michael S. Striker
ATTORNEY

INVENTOR
Carl A. Schmitt
BY: Michael S. Striker
ATTORNEY

Dec. 27, 1960 C. A. SCHMITT 2,966,557

TELEPHONE DIALING APPARATUS

Filed Aug. 1, 1957 5 Sheets-Sheet 3

INVENTOR:
CARL A. SCHMITT

BY

Michael S. Striker
his ATTORNEY

Dec. 27, 1960 C. A. SCHMITT 2,966,557

TELEPHONE DIALING APPARATUS

Filed Aug. 1, 1957 5 Sheets-Sheet 4

INVENTOR
Carl A. Schmitt
BY: Michael S. Striker
ATTORNEY

Dec. 27, 1960 C. A. SCHMITT 2,966,557

TELEPHONE DIALING APPARATUS

Filed Aug. 1, 1957 5 Sheets-Sheet 5

INVENTOR
Carl A. Schmitt
BY: Michael S. Striker
ATTORNEY

United States Patent Office 2,966,557

Patented Dec. 27, 1960

2,966,557

TELEPHONE DIALING APPARATUS

Carl A. Schmitt, Gaussstrasse 74A, Stuttgart, Germany

Filed Aug. 1, 1957, Ser. No. 675,769

8 Claims. (Cl. 179—90)

The present invention relates to a telephone dialing apparatus, and more particularly to an automatic telephone dialing apparatus in which the dialing operation is controlled by a punched card.

It is one object of the present invention to provide a telephone dialing apparatus which can be connected to an existing telephone apparatus for performing automatic dialing operations under the control of a punched card.

It is another object of the present invention to provide a telephone dialing apparatus which repeats the dialing operation when the dialed number is busy.

It is another object of the present invention to provide a dialing apparatus in which the dialing operation can be interrupted for an exchange of messages with the exchange.

It is another object of the present invention to provide a telephone dialing apparatus which is controlled by a very simple punched card.

It is another object of the present invention to provide a telephone dialing apparatus which automatically ejects the punched card after the dialing operation has been carried out under control of the punched card.

It is another object of the present invention to provide a telephone dialing apparatus in which a standard selector disc operates a pulse transmitter under the control of a punch card in the same manner and at the same speed as if manually operated.

With these objects in view, the present invention mainly consists in a telephone dialing apparatus which comprises, in combination, analyzer means including a set of analyzing brushes, transporting means for transporting punched cards past the analyzing brushes, a selector disc of a standard telephone apparatus operating a pulse transmitter when turning in one direction and being urged by return means to turn to a terminal position which is the normal position of the selector disc, drive means for turning the selected disc out of the normal position, and for driving the transporting means, first contact means operated by the selector disc in the terminal position and a plurality of second contact means operated by the selector disc in other positions thereof, and coupling means for selectively coupling the drive means with the selector disc and with the transporting means.

Circuit means connect the elements so that when a certain hole in the card is sensed by the analyzer means, the coupling means are connected to the transporting means and transport the punched card to a first operative position, whereupon due to a connection established by another analyzing brush through another hole in the card, the coupling means is shifted to turn the selector disc out of its terminal positions until the selector disc reaches a position corresponding to the number which is to be dialed. In this position of the selector disc a hole is provided in the punched card so that the respective analyzing brush closes a circuit through the respective second contact means by which the coupling means is moved to an inoperative position permitting the selector disc to automatically return to its terminal position while actuating the pulse transmitted. When the selector disc has returned to its terminal position, another circuit is closed so that the coupling means is shifted again to actuate the transporting means which feed the card to the next following position. The punched hole provided in this position is again analyzed and the selector disc correspondingly operated until the entire number has been dialed.

In accordance with a preferred embodiment of the present invention, means are provided for reversing the drive means when a complete telephone number has been dialed so that the card is automatically ejected. Furthermore, it is advantageous to provide means for repeating the entire operation when the dialed telephone number is busy.

According to a modified embodiment, in addition to the punched controlled apparatus, another selector apparatus is provided which is controlled by push-buttons. A switch means is provided for connecting either the punched card controlled apparatus, or the push-button controlled apparatus to the telephone apparatus. It is also contemplated to provide switch means for selectively connecting the apparatus according to the present invention to the telephone system or to the teletype system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
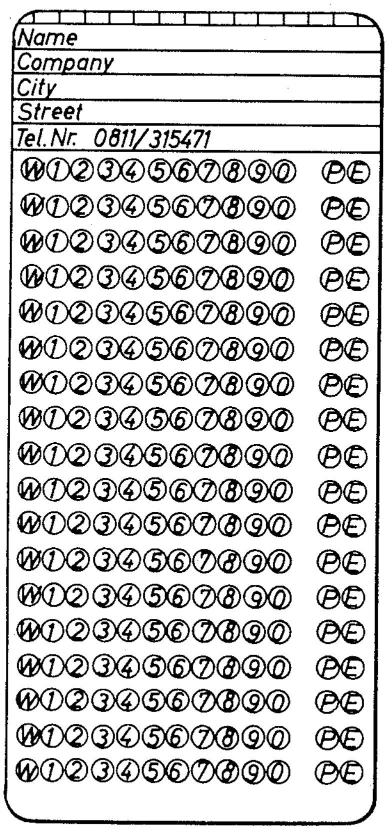
Fig. 4 is a view showing a punched card used in the apparatus of the present invention.

Referring now to the drawings, Fig. 4 illustrates a punched card as used in the apparatus of the present invention. The punched card contains a legend stating the name and address of a telephone subscriber, and his telephone number which is indicated to be 0811–315471. The punched card contains twelve columns and a desired number of lines depending on the number of orders of the telephone numbers. The first column contains index positions indicated by the letter W, the following ten columns are associated with the ten digits, and the last two columns are indicated by the letters P and E. The index positions are indicated by circles, and the desired number can be entered on a card by punching corresponding holes in the ten numerical columns. For example, in the first line on the right-hand side of Fig. 4, the digit 0 is punched, and in the next following line the digit 8 is punched. Punching of the hole P results in a pause in the dialing operation, and punching of a hole E results in termination of the dialing operation, and consequently the hole E is punched in the last line. The holes W serve for controlling the operations, as will be described hereinafter.

Figure 3:
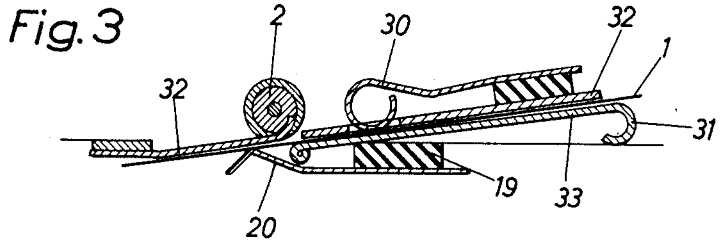
Fig. 3 is a cross sectional view of a detail of the transporting means.

The card 1 is inserted into the apparatus into a slot formed by members 31 and 32, and is urged by springs 30 against the slot as shown in Fig. 3. A set of analyzing brushes, generally indicated by the reference numeral 20, is provided for analyzing the thirteen columns of the card. A transporting roller 2 engages the card and transports the same past the analyzing brushes 20. The analyzing brushes are mounted on an insulating bar 19, so that a circuit is closed when an analyzing brush engages a contact piece 32 which is connected to ground. Such engagement takes place when a punched hole in the card is located opposite a brush 20.

Figures 1, 2:
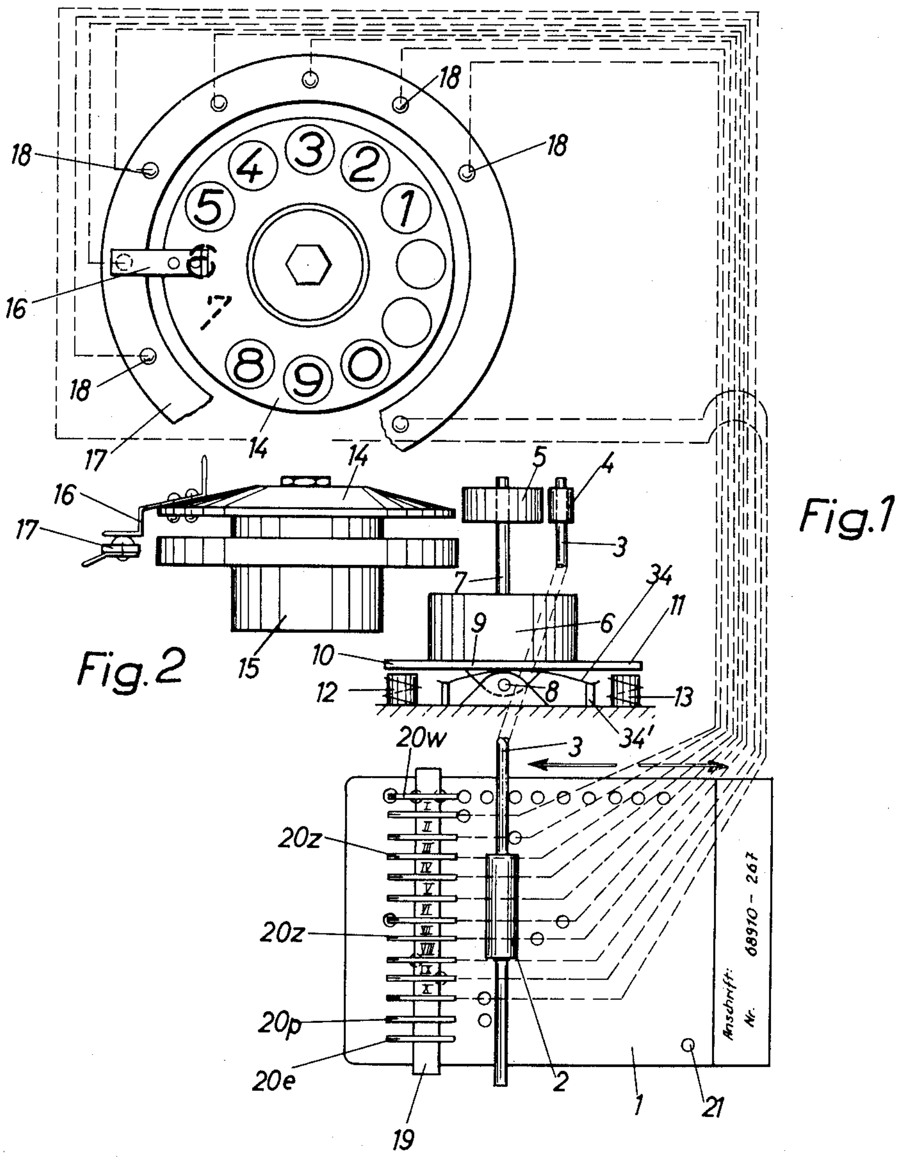
Fig. 1 is a schematic fragmentary plan view illustrating the basic arrangement of an embodiment of the present invention.
Fig. 2 is a fragmentary side view of the embodiment illustrated in Fig. 1.

The lower portion of Fig. 2 illustrates the same arrangement in a schematic manner. The analyzer means is shown to include one brush 20*w*, ten brushes 20*z*, one brush 20*p*, and one brush 20*e*. It will be understood that the brush 20*w* analyzes the W column, the brush 20*p* analyzes the P column and the brush 20*e* analyzer the E column. The brushes 20*z* analyze the numerical columns.

The selector disc 14 of a standard telephone apparatus is illustrated in the upper portion of Fig. 1 and in Fig. 2. The selector disc 14 is associated with a stepping switch which includes a plurality of stationary contacts 18 which are respectively connected to the brushes 20*z*, and a contact arm 16 which is secured to the selector disc. When the selector disc 14 is turned, the contact arm 16 successively engages the stationary contacts 18 on the insulating ring 17 and when the selector disc is relieved, it automatically returns in a known manner under the action of return means in the housing 15 until it assumes again its terminal normal position. During such return movement, a pulse transmitter is actuated in a known manner.

As shown in Fig. 2, a motor 6 is mounted on a rockable member 9 and drives through a shaft 7 a friction wheel 5. A coupling wheel 4 is turnably mounted adjacent the friction wheel 5 and connected to shaft 3 of the transporting roller 2. A first electro-magnetic means 12 is located opposite the end portion 10 of the rockable member 9, and a second electro-magnetic means 13 is located opposite the end portion 11 of the rockable member 9. At least the end portions 10 and 11 consist of iron so as to be attracted when the electro-magnetic means 12 and 13 are energized.

When the solenoid of the electro-magnetic means 12 is energized, the end portion 10 is attracted, and the rockable member 9 pivots about the pivot means 8 into a first position in which the friction wheel 5 engages the rim of the selector disc 14. When the solenoid of electro-magnetic means 13 is energized, the end portion 11 is attracted, and the rockable member 9 pivots into a second position in which the friction wheel 5 is in frictional engagement with the coupling wheel 4 so that the transporting roller is driven to transport the card 1. A leaf spring 34 engages the rockable member 9 and tends to hold and to return the same into an intermediate position in which the friction wheel 5 is inoperative and spaced from the selector disc 14 and from the coupling wheel 4.

The normal direction of rotation of the motor 6 is such that the selector disc 14 is turned out of its normal terminal position when the friction wheel 5 drives the selector disc 14. When the rockable member 6 assumes again its inoperative intermediate position illustrated in Fig. 2, the selector disc will automatically return in a known manner to its normal position while simultaneously actuating a pulse transmitter.

Figure 5:
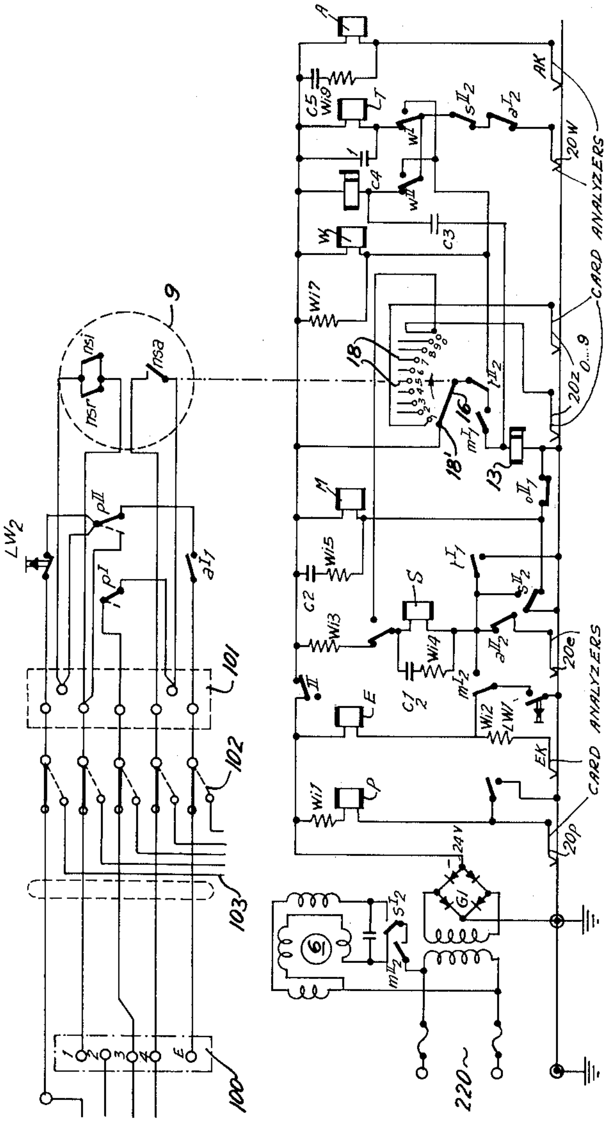
Fig. 5 is a diagram illustrating the electrical connections of the preferred embodiment of the present invention.

Fig. 5 illustrates the electrical connections between the above-described elements, as well as relays and switches which are provided in the circuits connecting the elements of the apparatus. The diagram of Fig. 5 shows the motor 6, a rectifier G1, the analyzing brush 20*p*, the analyzing brush 20*e*, the analyzing brush 20*w*, and two brushes 20*z* representing the ten brushes 20*z*. As previously described, the brushes 20*z* are connected to the stationary contacts 18 which cooperate with the contact arm 16. The electromagnetic means 12 and 13 for shifting the rockable member 9 are also shown in Fig. 5.

The upper portion of Fig. 5 schematically shows the housing 9 in which the pulse transmitter is mounted, the five terminals 100 of the telephone apparatus, the five terminals 101 of the dialing apparatus, and a switch 102 by which the dialing apparatus can be connected to the lines 103 of a teletype system.

Six relays are connected into the circuit of Fig. 5. The relay E is provided for connecting the other relays, the relay T controls the transport of the punched card, the relay A controls the start of the analyzing of the card, the relay W controls the turning of the selector disc, the relay S determines the end of the card transport, and the start of the card ejection, and the relay P determines a pause in the dialing operation. Each of these relays controls switches which are designed by corresponding lower case letters provided with indices. Two sensing contacts EK and AK are respectively connected in series with the relays T and A and sense the position of the card.

The apparatus operates in the following manner:

When the apparatus is connected to a source of electric current, the relay E and the relay P are energized. All other relays and electro-magnetic means are disconnected by the switches *e*II which are controlled by the relay E. The resistors W*i*1 and W*i*2 serve as overload protection.

When the card is inserted into the machine, its leading edge opens the sensing contact EK and the relay E releases so that the switch *e*II closes the circuit of all other relays. Relay M and relay A are energized. Relay M closes switch $m^{II}2$ so that motor 6 starts. Switch $m^{I}1$ energizes the solenoid of the electro-magnetic means 13 so that the rockable member 9 is shifted into a position in which the friction wheel 5 engages the coupling wheel 4 resulting in transport of the card by the transporting roller 2. The circuit of the electro-magnetic means 13 includes the switch *e*II, the contact arm 16, the stationary contact 18' which is associated with the terminal normal position of the selector disc 14, the switches $t^{II}2$, $m^{I}1$, and the solenoid of the electro-magnetic means 13.

The relay S is interrupted by the contact $a^{II}2$ and the relay T is interrupted by the switch $a^{I}2$. The card 1 is transported and passes under the analyzer means 20 so that all brushes are interrupted. Shortly after that, the relay A releases since its sensing contact AK is slightly displaced. Thereby relay S and relay P are ready for the following operation.

During the movement of the card, the first punched hole reaches the analyzing brush 20*w*. The relay T is energized, and the switch $t^{II}2$ interrupts the circuit of the electro-magnetic means 13 so that the spring 34 returns the rockable member into its intermediate inoperative position. Since the transporting means 4 and 2 are no longer driven, the card stops. The electro-magnetic means 12 is energized at the same time through switches $a^{I}2$, $s^{II}2$, $w^{II}$, and $e^{I}1$ so that the friction wheel 5 moves to a position engaging the selector disc 14. The motor 6 rotates the friction wheel 5 and turns the selector disc out of its normal position.

The contact arm 16 moves with the selector disc and passes over the stationary contacts 18 until it reaches a stationary contact 18 which is connected to an analyzing brush 20*z* connected to ground through a punched hole in the card. When the contact arm 16 engages such a stationary contact 18, the relay W is energized, and the switch $w^{II}$ disconnects the electro-magnetic means 12 so that the friction wheel 5 releases the selector disc 14 and returns to its inoperative position.

The selector disc 14 is now free to return to its normal terminal position, and during such return the pulse transmitter *nsi* transmits selecting pulses in the same manner as if the selector disc were manually operated.

When the contact arm 16 is displaced, the circuit of the relay W is interrupted. Release of relay W would result in energizing of the electro-magnetic means 13, which is prevented by the switch $w^{II}$ which now closes the circuit 20$w$, $a^{I}$2, $s^{II}$2, $w^{II}$, W, and $e^{I}$1. Since the relay T has released, switch $t^{II}$2 is in its initial position.

The card must not be transported as long as the selector disc 14 returns to its normal position and controls the pulse transmitter *nsi*. Since the contact arm 16 closes the circuit of the electro-magnetic means 13 only when reaching the terminal stationary contact 18', the card is not transported during return movement of the selector disc. Relay W remains energized until the respective W hole of the card has passed the brush 20$w$ when the card is further transported upon closing of the circuit by the contact arm 16 engaging the terminal stationary contact 18'. The apparatus is now ready for the next operation in which the following line is sensed by the analyzer means for operating the selector disc.

The operations are repeated until all lines of the card are analyzed by the analyzer means. When the last W hole has passed the analyzer means, the card would be further transported and remain in the apparatus. It is desired to eject the card after completion of the selection of the telephone number, and for this purpose an E hole 21 is punched in the column E in the line trailing the last line of the card in which a W hole is provided as shown in Fig. 1. When the analyzing brush 20$e$ senses a punched hole 21, the relay S is energized through switches $a^{II}$2, $t^{II}$1, and $e^{II}$. The switch $s^{I}$2 reverses motor 6 so that the direction of the transporting roller 2 is reversed, and the card is transported in opposite direction, and ejected.

At the same time the relay P is energized which through its switches $p^{I}$ and $p^{II}$ prevents the transmitting of pulses during the ejection of the card.

The holding switch $s^{II}$1 prevents release of the relay S, and at the same time the circuit of relay P is interrupted by the switch $s^{II}$2 so that the motor runs in reversed direction until the relay A is energized and disconnects the relay M by operation of the switch $a^{II}$1. Since relay M interrupts the motor current through switch $m^{II}$2, and interrupts the electro-magnetic means 13 by switch $m^{I}$1, the card would stop unless the release of relay M were delayed by the elements C2 and W*i*5. Consequently, there is sufficient time for the card to pass under the transporting roller. The card can now be removed from the machine, or the operation may be repeated.

In accordance with the present invention, means are provided for interrupting the dialing operation at a selected point, and for providing a pause between the dialing of groups of numbers. For example, in long distance calls, a first group of numbers or characters is dialed to connect the subscriber with the exchange, and thereupon the dialing operation is interrupted by a pause during which the subscriber can listen to the operator of the exchange and indicate his own telephone number for billing purposes.

A pause is determined by a punched hole in the P column in the card. In the card shown in Fig. 4 a punched P hole is marked in the fifth line. When the analyzing brush 20$p$ senses a punched P hole, a circuit is completed by which the transmission of pulses is interrupted.

The duration of the pause can be determined by a thermal relay, or by any other electro-magnetic or mechanical delay mechanism. In accordance with a preferred embodiment of the present invention, the selector disc 14 is used for determining pauses of different lengths. For example, if the zero hole is punched in the same line as the P hole, the selector dial will be turned to the zero position and then returned. During this operation, the pulse transmitter is short circuited if the analyzing brush senses a P hole. This arrangement corresponds to the shortest possible pause, and when, for example, the hole in the line column is punched in the same line as the P hole, the selector dial will turn to the line position and then returned to terminal position which requires a much longer time period. Consequently, the duration of the pause is determined by a punched hole in one of the numerical columns of the card appearing in the same line as the P hole.

If it is desired to further extend the pause, a P hole can be punched in the following line together with a hole in one of the numerical columns. In this event, the nine hole will be punched in the first line in which a P "hole" is punched. It is apparent that any length of the pause can be determined by punching a selected number of lines with P holes.

Referring again to the diagram of Fig. 5, when a P hole is sensed by the analyzing brush 20$p$, the previously described operation is started since in the same line are punched a W hole and a numerical hole. However, since the relay P is energized, the switch $p^{II}$ short-circuits the pulse switch *nsi* so that no pulses are transmitted into the telephone system. The circuit of the switch *nsi*, which is normally closed by the switch $p^{I}$, is interrupted by the switch $p^{I}$ which opens when the relay P is energized. Due to the fact that the switch *nsa* is open, it is possible to listen during the pause to signals arriving from the telephone system, such as a busy signal, or remarks made by the operator.

Figure 6:
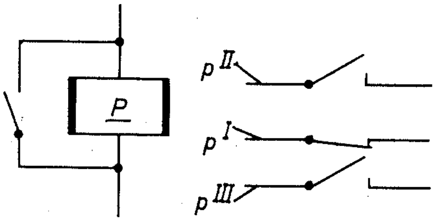
Fig. 6 is a fragmentary diagram illustrating a detail.

In accordance with the present invention, the pause may also be used for transmitting a recorded message from a record tape into the telephone system. Fig. 6 illustrates the arrangement of the required switches, and it will be understood that the switch $p^{III}$ completes the circuit of a tape recorder which reproduces its recorded message. When the message has been completed, a metal piece on the recording tape connects a pair of contacts in a circuit which effects release of the relay P so that the electro-magnetic means 13 is energized and the punched card 1 is transported one step. Thereupon the following number is automatically dialed. Instead of a tape recorder, a record player may be used, and in this event the pick-up arm of the phonograph closes the contact effecting release of the relay P.

It is frequently necessary to interrupt a started dialing operation, and to cancel the previously established connection. A push-button, not shown, is provided for this purpose. When the push-button is actuated, the switch $LW_2$ interrupts the connection to the telephone system so that the line is cleared for the new call. The switch $LW_1$ effects energizing of the relay S through the switches $m^{I}$2, $t^{II}$1, and $e^{I}$1. The relay S is held by the holding switch $s^{II}$1 when the push botton is released, and controls through the switch $s^{I}$2 the reversing of the motor so that the card is ejected in reverse direction.

The push-button has a second function, that is the repeating of the dialing operation. Such repeated dialing must not take place before the card has been completely ejected after an incomplete dial operation, since otherwise only a part of the punched holes of the card would control the following dialing operation, and the first punched holes would be ineffective.

Due to the provision of the switch $m^{I}$2, the circuit is maintained in the desired condition until the relay M releases, which corresponds to the complete ejection of the card. As explained above, the relay M is only energized when the sensing contact EK senses a card. When the relay M releases, the switch $LW_1$ is connected through the switch $m^{I}$2 with the relay E. When push-button is actuated, the relay E is energized and the switch $e^{II}$ opens the circuit and the condition before the insertion of the punched card is obtained. When the push-button is released, the relay E is released, and switch $e^{II}$ closes so that the apparatus is ready for the next following dialing operation.

It is of no consequence whether the push-button is maintained in depressed condition during the ejection of the card, or released, and later on depressed for the repetition of the previously attempted dialing operation. As soon as the relay M has released, which indicates a complete rejection of the card, the dialing operation can be repeated.

In the event that a number has not been properly punched in a line of the card, for example if a punched hole has been omitted or inaccurately placed so that the respective brush cannot establish contact in the respective position, the contact arm 16 would run to the terminal position until engaging the stationary contact 18', which would result in the dialing of a wrong number.

In order to avoid this source of errors, a special circuit is provided. If the contact arm 16 passes all stationary contacts 18 and is not connected to ground when reaching the last stationary contact 18 associated with the digit 0, a circuit is completed from the positive terminal, $t^{I}$1, $t^{III}$1, 0 contact, contact arm 16, $t^{II}$2, relay W, and switch $e^{II}$. Relay S is energized by current passing through relay W and the resistor W*i*7, and responds. Relay T releases, and disconnect the relay S. However, relay S is held through the holding switch $s^{II}$1, and moreover a delay is effected by the circuit C1 and W*i*4 so that the relay T has sufficient time to actuate the switch $t^{II}$1. Consequently, the last wrong series of pulses cannot be transmitted any more to the telephone system, since the switch $s^{I}$1 has simultaneously energized the relay P which effects short circuiting of the pulse transmitter switch *nsi*.

In the event that the stationary zero contact 18 is to be dialed, and is connected to ground, the relay S has the same potential across its terminals, and cannot respond.

When the dialing apparatus according to the present invention is connected to a telephone system in which the connection with the exchange is established by actuation of a connection with ground by means of a push-button, the dialing apparatus automatically carries out this operation. When the apparatus is disconnected, the switch $p^{II}$ produces a ground connection which is, however, interrupted by the switch $a^{I}$1. When the apparatus is connected to the source of current, the switch $p^{II}$ is opened, and the connection to ground is interrupted at two points. When the card is inserted, the relay A responds, and the switch $a^{I}$1 closes. The connection is interrupted as before by the switch $p^{II}$, but when the card is analyzed by the brush 20*p*, the switch $p^{II}$ is actuated and establishes the ground connection. The ground connection is maintained until the delayed relay A releases and opens switch $a^{I}$1. The dialing operation may now start. As long as the card is in the apparatus, the sensing contact AK is interrupted, so that relay A is released, and switch $a^{I}$1 is open. Under no circumstances a ground pulse can be transmitted. During the return movement of the card, the relay P is automatically energized, even during the time in which the card passes through the analyzing brush 20*p*. Consequently only during a single moment of the entire operation is it possible to establish the ground connection so that all errors in this respect are prevented.

In the above-described embodiments of the present invention, the dialing operations are controlled by the W holes. In accordance with a modified arrangement of the present invention, the W column may be omitted in the punched card, and the analyzing brushes 20*z* used for controlling the operation by energizing two relays, one of which responds later which may be obtained by providing different resistances in the circuits of the relays.

Figure 7:
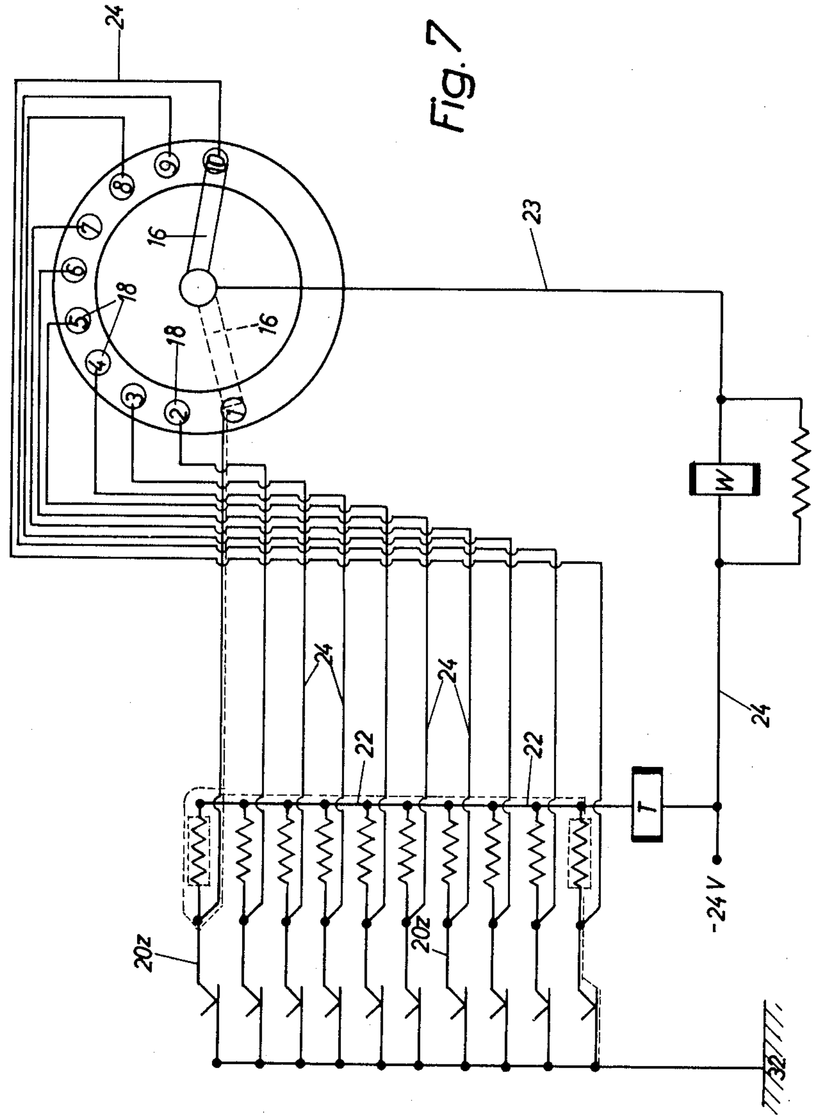
Fig. 7 is a diagram illustrating the electrical connections of a modified embodiment of the present invention.

A modified embodiment of this type is illustrated in the diagram of Fig. 7. The left-hand portion of the figure shows the grounded mass 32 which is resiliently engaged by 10 analyzing brushes 20*z*. It is assumed that one of the analyzing brushes 20*z*, in the illustrated example the analyzing brush 20*z* associated with the digit 0, is connected to ground through a punched hole in the analyzed card.

The analyzing brushes 20*z* are respectively connected to the stationary contact 18. In addition thereto, all analyzing brushes 20*z* are connected through a resistor of, for example, 200 ohm with the conductor 22 with which is connected the relay T.

If any one of the analyzing brushes 20*z*, in the present example the brush associated with the digit 0, is connected to ground through a punched hole in the card, the relay T responds, since the resistance of 200 ohm does not limit the current below a value at which it would be insufficient to operate the relay T.

The electro-magnetic means 13 is deenergized, and the electro-magnetic means 12 is energized so that the rockable member 6 is pivoted and the friction wheel 5 engages the selector disc 14 to wind up the selector mechanism, while the card transport is interrupted.

The circuit is completed through the contact arm 16 and the relay W when the contact arm 16 arrives at the stationary contact 18 connected to the analyzer brush 20*z* associated with the digit 0. The relay W responds and interrupts the circuit of the electro-magnetic means 12 so that the rockable member 9 returns to its intermediate inoperative position permitting the selector disc 14 to return to its terminal position and during such return movement to produce the required number of pulses.

While each of the stationary contacts 18 is also connected through a resistor of 200 ohm with the analyzing brush 20*z* associated with the digit 0, there are always two resistors of 200 ohm connected in series. This path of the current in the moment at which the contact arm 16 is in contact with the respective stationary contact 18 associated with the digit 1, is indicated by a broken line. The path of the current is continued through the contact arm 16 indicated in broken lines, the conductor 23, the relay W with a parallel resistor of 600 ohm and finally through the conductor 24 which is connected to the source of current of —24 volts.

The current in this path is limited by two resistors of 200 ohm and is consequently insufficient to effect a response of the relay W which is shunted by a resistor of 600 ohm. The same is the case, if the contact arm 16 consecutively contacts the stationary contacts 18 which are associated with the digits from 2–9. The relay W only responds, when the contact arm 16 reaches the stationary contact 18 associated with the digit 0, in which case the circuit is completed through the analyzing brush 20*z* associated with the digit 0, the respective connection 24, the contact 18, the arm 16, the line 23, relay W and conductor 24.

According to another modified embodiment of the present invention, the E column may be omitted, and a relay controlling the motor provided. The relay is so connected that the motor is reversed unless another punched hole is sensed by the analyzing brushes. When after all holes in the card have been sensed by the analyzer means, no further hole reaches the analyzer means within the predetermined delay time, and consequently the reversing relay automatically reverses the motor to eject the card.

In accordance with a further improvement of the present invention, in addition to the punched card operated apparatus for dialing telephone numbers, a push-button operated selector apparatus is provided, and it is possible to either connect the push-button selector, or the punched card selector to the telephone system.

Each push-button is associated with a frequently required telephone number, and correspondingly designated. By actuation of any one push-button, a relay arrangement is actuated by which the dialing apparatus of the present invention is controlled, whereas otherwise the same operations are controlled by the punched card as previously described.

Figure 8:
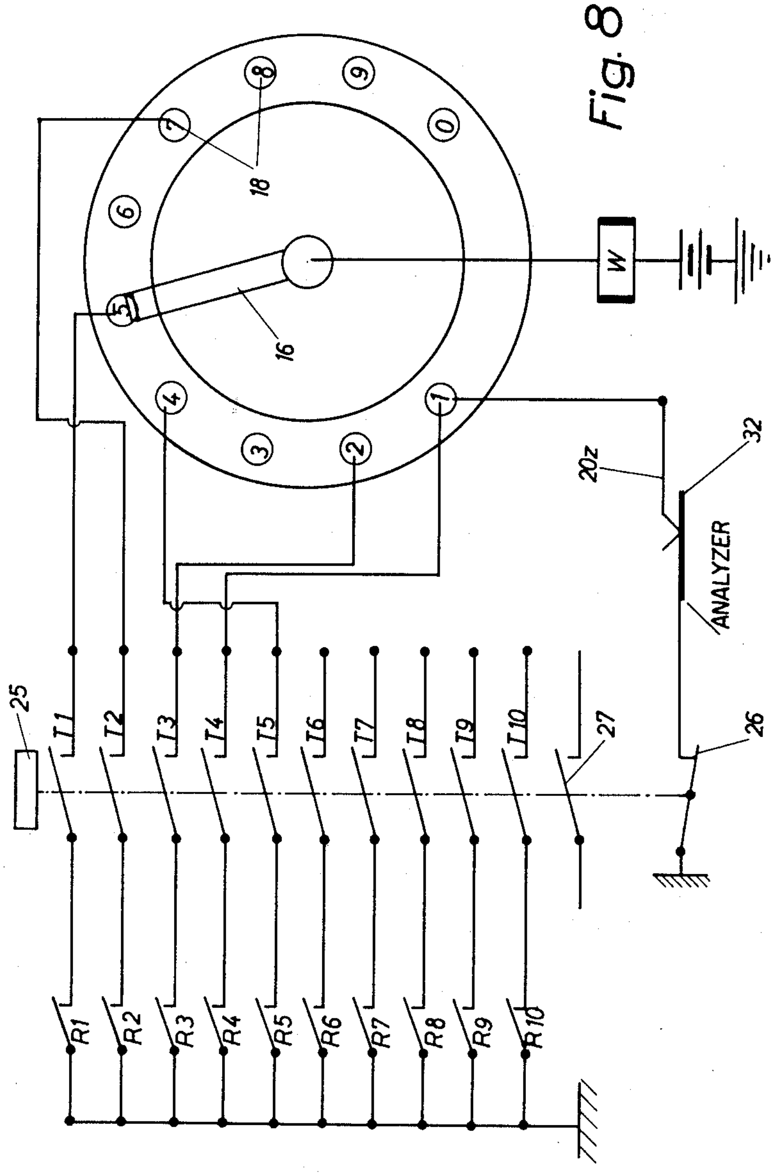
Fig. 8 is a diagram illustrating the electrical connections of an apparatus which is advantageously used together with the punched card controlled apparatus of the present invention.

A diagram of this arrangement is shown in Fig. 8, which illustrates an apparatus constructed for numbers having ten orders. It will be understood that the device could be modified for telephone numbers having more than ten orders.

The keyboard has, for example, 20 numbered fields, each of which is provided with a push-button 25. When a push-button 25 is operated, the following operations take place:

(a) The switch 26 is opened, and all analyzing brushes 20z are disconnected from ground 32.

(b) The switch 27 is closed, and a chain of relays is connected and energized.

(c) The switches P1 to P10 are closed.

Each of the switches P1 to P10 is connected on one hand to an associated switch R1 to R10, respectively, of a relay chain, and on the other hand to the stationary contacts 18 which are respectively associated with the digits of the number to be dialed.

In the illustrated example, the push-button 25 is associated with the telephone number 57214. Consequently, the switch P1 is connected with the stationary contact 18 associated with the digit 5, the second switch P2 is connected to the stationary contact associated with the digit 7, and so forth. When the push-button 25 is depressed, the switch 27 is closed, and the relay chain starts its operation so that the electro-magnetic means 12 is energized which effects coupling of the motor 6 with the selector disc 14.

The switch R1 is closed, and a circuit is completed through ground, R1, T1, contact 18 associated with the digit 5, and relay W. Relay W responds, the electro-magnetic means 12 releases, the selector disc 14 returns to its terminal position, and the pulse transmitter 15 transmits a number of pulses corresponding to the digit 5. The operation is repeated in the same manner with the following digits until the last digit of the respective dialed telephone number has been dialed.

Since depression of the push-button 25 interrupts only the circuit of the analyzing brushes 20z, the transport of the punch card and its sensing is not influenced. Consequently, it is possible to either dial a telephone number by operation of a push-button or by insertion of a card.

Instead of a relay chain, a synchronous motor with a switching drum, contact springs, and staggered switching cams may be used.

It will be understood that each of the elements described above, or two or more together, may also find a useful application in other types of telephone dialing apparatus differing from the types described above.

While the invention has been illustrated and described as embodied in a punched card operated telephone dialing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Telephone dialing apparatus comprising, in combination, analyzer means including a set of analyzing brushes; transporting means for transporting punched cards past said analyzing brushes; a selector disc adapted to operate a pulse transmitter when turning in one direction; return means urging said selector disc to turn in said one direction to a terminal normal position; a motor; a friction wheel driven from said motor; an electrically controlled member supporting said friction wheel and being movable between a first coupling position in which said friction wheel frictionally engages said selector disc so that said motor is coupled to said selector disc for turning the same out of said terminal normal position, an intermediate releasing position and a second coupling position; a coupling wheel connected to said transporting means and being engaged by said friction wheel in said second coupling position of said member so that said transporting means are coupled to said motor for transporting a card; first circuit means connected to one of said analyzing brushes and including first contact means operated by said selector disc in said terminal normal position, said first circuit means being connected to said electrically controlled member for moving the same to said first position when said one analyzing brush senses a control hole in a card while said selector disc is in said terminal normal position whereby said selector disc is turned out of said terminal normal position; and second circuit means connected to said analyzing brushes, and including a plurality of second contact means respectively associated with a plurality of other positions of said selector disc, said second circuit means being connected to said electrically controlled member for moving the same out of said first position and to said intermediate releasing position when one of the other brushes senses a punched hole in the card and one of said second contact means connected with said one other brush is closed in one of said other positions of said selector disc so that said return means return said selector disc to said terminal position whereupon said first contact means completes a circuit for moving said electrically controlled member to said second coupling positon whereby the card is transported.

2. A telephone daling apparatus as set forth in claim 1 wherein said electrically controlled member is a rockable member supporting said friction wheel and being rockable for moving said friction wheel between first and second positions; and wherein said first circuit means include first electro-magnetic means for moving said rockable member to said first position, and wherein said second circuit means include a second electro-magnetic means for moving said rockable member to said second position; and spring means urging said rockable member to said intermediate releasing position.

3. Telephone dialing apparatus comprising, in combination, analyzer means including a set of analyzing brushes; transporting means for transporting punched cards past said analyzing brushes; a selector disc adapted to operate a pulse transmitter when turning in one direction; return means urging said selector disc to turn in said one direction to a terminal normal position; a stepping switch including a contact arm secured to said selector disc for turning movement with the same and a plurality of stationary contacts respectively connected to said analyzing brushes, one of said stationary contacts being associated with said terminal normal position of said selector disc; a motor; coupling means driven from said motor and being movable between a first position in which said motor is coupled to said selector disc for turning the same out of said terminal normal position, a second position in which said motor is coupled to said transporting means for transporting a card, and a third inoperative position; means urging said coupling means to move to said third inoperative position; first electro-magnetic means for moving said coupling means to said first position and being connected to said one stationary contact and to said contact arm so that said coupling means is moved to said first position when the analyzing brush associated with said one stationary contact senses a control hole in a card while said selector disc is in said terminal normal position whereby said selector disc is turned out of said terminal normal position; relay means and switches connected to said first electro-magnetic means, to the other stationary contacts, and to said contact arm for disconnecting said first electro-magnetic means when said contact arm engages one of said other stationary contacts associated with a brush sensing a punched hole so that said coupling means moves to said inoperative position and said return means returns said selector disc to said terminal normal position; and second electro-magnetic means for moving said coupling means to said second position and being connected to said stationary contacts and to said contact arm and into the circuit of said relay means and switches to be disconnected by the same during return movement of said selector disc, said second electro-magnetic means being actuated when said contact arm engages said one stationary contact after return of said selector disc to said terminal normal position whereby the card is transported.

4. Telephone dialing apparatus comprising, in combination, analyzer means including a set of analyzing brushes; transporting means for transporting punched cards past said analyzing brushes and including a coupling wheel; a selector disc adapted to operate a pulse transmitter when turning in one direction; return means urging said selector disc to turn in said one direction to a terminal normal position; a stepping switch including a contact arm secured to said selector disc for turning movement with the same and a plurality of stationary contacts respectively connected to said analyzing brushes, one of said stationary contacts being associated with said terminal normal position of said selector disc; a motor; an electrically controlled shiftable member; a friction wheel driven from said motor and being mounted on said shiftable member and being shiftable with the same between a first position in which said friction wheel engages said selector disc so that said motor is coupled to said selector disc for turning the same out of said terminal normal position, a second position engaging said coupling wheel so that said transporting means are coupled to said motor for transporting a card, a third position in which said friction wheel is inoperative; means urging said friction wheel to move to said third position; first electro-magnetic means for moving said shiftable member to said first position and being connected to said one stationary contact and to said contact arm so that said shiftable member is moved to said first position when the analyzing brush associated with said one stationary contact senses a control hole in a card while said selector disc is in said terminal normal position whereby said selector disc is turned out of said terminal normal position; relay means and switches connected to said first electro-magnetic means, to the other stationary contacts, and to said contact arm for disconnecting said first electro-magnetic means when said contact arm engages one of said other stationary contacts associated with a brush sensing a punched hole so that said shiftable member moves to said third position and said return means returns said selector disc to said terminal normal position; and second electro-magnetic means for moving said shiftable member to said second position and being connected to said stationary contacts and to said contact arm and into the circuit of said relay means and switches to be disconnected by the same during return movement of said selector disc, said second electro-magnetic means being actuated when said contact arm engages said one stationary contact after return of said selector disc to said terminal normal position whereby the card is transported.

5. Telephone dialing apparatus comprising, in combination, analyzer means including a set of analyzing brushes including a reversing brush; transporting means for transporting punched cards past said analyzing brushes; a selector disc adapted to operate a pulse transmitter when turning in one direction; return means urging said selector disc to turn in said one direction to a terminal normal position; a motor; electrically controlled coupling means driven from said motor and being movable between a first position in which said motor is coupled to said selector disc for turning the same out of said terminal normal position, a second position in which said motor is coupled to said transporting means for transporting a card, and a releasing position; first circuit means connected to one of said analyzing brushes and including first contact means operated by said selector disc in said terminal normal position, said first circuit means being connected to said coupling means for moving the same to said first position when said one analyzing brush senses a control hole in a card while said selector disc is in said terminal normal position whereby said selector disc is turned out of said terminal normal position; second circuit means connected to said analyzing brushes, and including a plurality of second contact means respectively associated with a plurality of other positions of said selector disc, said second circuit means being connected to said coupling means for moving the same out of said first position and to said releasing position when one of the other brushes senses a punched hole in the card and one of said second contact means connected with said one other brush is closed in one of said other positions of said selector disc so that said return means return said selector disc to said terminal position whereupon said first contact means completes a circuit for moving said coupling means to said second position whereby the card is transported; and means for reversing said motor connected to said reversing brush so that said motor is reversed when said reversing brush senses a reversing hole arranged in the card trailing all other holes so that said motor is reversed while said coupling means is in said second position after analysis of all other holes whereby the card is ejected by said transporting means.

6. Telephone dialing apparatus comprising, in combination, analyzer means including a set of analyzing brushes including a reversing brush; transporting means for transporting punched cards past said analyzing brushes; a selector disc adapted to operate a pulse transmitter when turning in one direction; return means urging said selector disc to turn in said one direction to a terminal normal position; a stepping switch including a contact arm secured to said selector disc for turning movement with the same and a plurality of stationary contacts respectively connected to said analyzing brushes, one of said stationary contacts being associated with said terminal normal position of said selector disc; a motor; coupling means driven from said motor and being movable between a first position in which said motor is coupled to said selector disc for turning the same out of said terminal normal position, and a second position in which said motor is coupled to said transporting means for transporting a card, said coupling means tending to assume a third inoperative position; first electro-magnetic means for moving said coupling means to said first position and being connected to said one stationary contact and to said contact arm so that said coupling means is moved to said first position when the analyzing brush associated with said one stationary contact senses a control hole in a card while said selector disc is in said terminal normal position whereby said selector disc is turned out of said terminal normal position; relay means and switches connected to said first electro-magnetic means, to the other stationary contacts, and to said contact arm for disconnecting said first electro-magnetic means when said contact arm engages one of said other stationary contacts associated with a brush sensing a punched hole so that said coupling means moves to said inoperative position and said return means returns said selector disc to said terminal normal position; second electro-magnetic means for moving said coupling means to said second position and being connected to said stationary contacts and to said contact arm and into the circuit of said relay means and switches to be disconnected by the same during return movement of said selector disc, said second electro-magnetic means being actuated when said contact arm engages said one stationary contact after return of said selector disc to said terminal normal position whereby the card is transported; and means for reversing said motor connected to said reversing brush so that said motor is reversed when said reversing brush senses a reversing hole arranged in the card trailing all other holes so that said motor is reversed while said coupling means is in said second position after analysis of all other holes whereby the card is ejected by said transporting means.

7. An apparatus as set forth in claim 6 wherein said transporting means include a transporting drum; and including leaf spring means for urging the card against said transporting drum.

8. An apparatus as set forth in claim 6 and including a delay relay connected into the circuit of said reversing means.

References Cited in the file of this patent

UNITED STATES PATENTS

| | | |
|---|---|---|
| 1,570,030 | Balch | Jan. 19, 1926 |
| 1,882,106 | Wise | Oct. 11, 1932 |
| 2,579,983 | Thornton | Dec. 25, 1951 |
| 2,813,931 | De Forest | Nov. 19, 1957 |